3,065,185
METHOD OF MAKING A CHROMATOGRAPHIC PACKING
Patricia L. Burns, Chicora, Pa., and Ludwig Luft, Cincinnati, Ohio, assignors to MSA Research Corporation, Pittsburgh, Pa., a corporation of Pennsylvania
No Drawing. Filed Aug. 12, 1959, Ser. No. 833,130
4 Claims. (Cl. 252—428)

This invention has to do with packing for use in gas chromatography, and more particularly gas-liquid partition chromatography in which the desired separation is accomplished by a liquid distributed over an inert sub-strate. The conventional method of preparing packing for such purposes is to thinly coat the supporting material, or sub-strate, by dissolving the partitioning liquid in a suitable solvent, mixing the solution with the sub-strate, and then evaporating the solvent. This method is involved, time consuming, and uneconomical due to loss of the solvent. Also, there is no assurance that the liquid coating is uniform.

It is among the objects of this invention to provide packing material for gas-liquid partition chromatography in the form of pellets that are dry to the touch and comprise an inert sub-strate and a uniformly distributed partitioning liquid; that are easily and rapidly prepared with readily available equipment; that give sharp separations of gas mixtures; and that in comparison with conventional packings permit the use of shorter columns for equivalent separations, afford lower pressure drop in the column, effect separations in shorter times, and are longer lived.

A further object is to provide a method of preparing packings in accordance with the foregoing object that is simply and easily practiced with conventional sub-strates and partitioning liquids using readily available equipment; that assures uniformity of the liquid coating and of the resultant packing; and that avoids the necessity of applying the partitioning liquid in solution with subsequent removal of the solvent.

In accordance with the invention its objects are attained by preparing an intimate mixture of the sub-strate and the partitioning liquid in proportions such that the mixture is dry to the touch, and hot pressing the mixture at a temperature below the boiling point of the liquid at the pressing pressure to produce a hard, coherent and uniform product that is then crushed and classified into particles of desired sizes.

Packings produced in this way have numerous advantages over those prepared in accordance with the conventional practice alluded to above. For example, for equivalent separations our new packing permits the use of shorter columns with consequent lower pressure drop in the column and in shorter periods of time. The packings are prepared more readily and more quickly than when the liquid is applied in the form of a solution to the sub-strate with subsequent evaporation of the solvent. We believe also that the packings provided by the invention have longer life than those prepared using solutions of the partitioning liquids. Further advantages flowing from the invention are uniformity of the packings and easy quality control.

As those familiar with the art of chromatography will understand, a wide choice of sub-strates are available, the exact selection of which will depend in part upon the system to be treated, a factor that is easily and readily determinable in any given case. In general, any solid inert to the system and the partitioning liquid may be used although adsorbent supports are preferred for most purposes. Examples of inert supports for the invention are Celite, colloidal carbon, activated carbon, magnesia, alumina, silica gel, various ion exchange resins, and the like.

The choice of the partitioning liquid likewise depends on the system to be treated and is governed by well-known principles of gas-partition chromatography. Examples of such liquids from among the many that are available, will appear hereinafter.

As indicated above, the sub-strate and the liquid are mixed intimately in such proportions that the mixture is dry to the touch. This mixture is then pressed at an elevated temperature below the boiling point of the liquid at the prevailing pressure to form a coherent, uniform and relatively hard and noncrumbling compact. The exact pressure to be used is dependent, at least in part, upon the partitioning liquid, and as a general rule the more viscous the liquid the higher the pressure should be. For many purposes it suffices to press the mixture at from 1500 to 10,000 pounds per square inch, the exact value depending upon the sub-strate and the liquid. The resultant compact is then crushed to form pellets that are classified into desired sizes according to the system with which they are to be used and the column diameter and length.

The technique of using the packings provided by the invention plays no part in it. The practice of chromatography is well understood as are also the modes of recovering the separated fractions and identifying them. However, the practice of the invention and the efficacy of the packings that it provides will be understood from the following examples.

*Example 1*

A 1-to-1 intimate mixture by weight of N,N-diethyl-formamide and Cab-o-sil (a submicroscopic silica prepared by vapor phase hydrolysis of a silicon compound) was pressurized to 3200 p.s.i at 100° C. The compact was crushed and the particles passing a 60-mesh sieve were packed into a column 12 inches long by ¼ inch I.D. With an eluent flow rate of 50 cc./min. this column completely separated in two minutes a mixture of equal amounts of n-butane, isobutane, butene-2 and 1,3 butadiene.

Using a similar eluent flow rate a column of the same dimensions packed with firebrick coated in the conventional manner as outlined at page 1, first paragraph, with the liquid of this example effected no separation of the same gas mixture.

*Example 2*

A mixture of Cab-o-sil and diethylformamide (1 to 1 by weight) was pressed at 3185 p.s.i. at 100° C. and the compact crushed and screened to recover the minus 60-mesh pellets that were packed in a column like that of Example 1. Using helium as an eluent at a flow rate of 50 cc./min. with the column maintained at 26° C. the following mixture was separated with the stated retention times:

| | Seconds |
|---|---|
| Ethylene | 50 |
| Acetylene | 75 |
| Butene | 180 |

*Example 3*

This example was the same as Example 2 except that in this instance the partitioning liquid was dibutylphthalate. Using helium as an eluent at a flow rate of 60 cc./min. and with the column maintained at 0° C., the following mixture was separated with the stated retention times:

| | Seconds |
|---|---|
| Methane | 25 |
| Ethlyene | 40 |
| Propane | 90 |
| n-Butane | 250 |
| Butene | 600 |

Example 4

Here a mixture of Cab-o-sil and Halocarbon (Halocarbon Products Corp. a blend of completely halogenated chlorofluorocarbons) was pressed at 2550 p.s.i. at 100° C. and the compact crush and graded to recover the minus 60-mesh particles. Using helium as an eluent at 50 cc./min. and like that of Example 1 and at a column temperature of 100° C. the following mixture was separated with the stated retention times:

| | Seconds |
|---|---|
| Chloroform | 40 |
| Ethyl ether | 72 |
| Acetone | 175 |
| Acetonitrile | 500 |

Example 5

In this example a 1 to 1 by weight intimate mixture of Cab-o-sil and benzyl benzoate was pressed at 100° C. under 3830 p.s.i. Minus 60-mesh particles were packed in a column the same as in the preceding examples. With the same eluent and flow rate as in Example 4 but with the column maintained at 50° C. the following mixture was separated with the stated retention times:

| | Seconds |
|---|---|
| Methane | 60 |
| Propane | 150 |
| Propylene | 180 |
| n-Butane | 300 |
| Butene | 500 |

According to the provisions of the patent statutes, we have explained the principle of our invention and have described what we consider to represent its best embodiment. However, we desire to have it understood that, within the scope of the appended claims, the invention may be practiced otherwise than as specifically described.

We claim:

1. The method of making a chromatographic packing comprising preparing an intimate mixture of an inert solid sub-strate and a partitioning liquid in proportions such that the mixture is substantially dry to the touch, hot pressing the mixture under a pressure of at least about 1500 pounds per square inch at a temperature below the boiling point of the liquid under the applied pressure, and crushing the resultant compact.

2. The method according to claim 1, said sub-strate being colloidal silica.

3. The method of making a chromatographic packing comprising preparing an intimate mixture of an inert solid adsorbent substrate and a partitioning liquid in proportions such that the mixture is substantially dry to the touch, pressing the mixture under a pressure of at least about 1500 pounds per square inch to form a relatively hard, non-crumbling compact while at a temperature below the boiling point of the liquid under the applied pressure, crushing the resultant compact to form granules, and classifying the granules into desired sizes.

4. The method according to claim 3, said partitioning liquid being selected from the group consisting of diethylformamide, dibutylphthalate and benzyl benzoate.

References Cited in the file of this patent

UNITED STATES PATENTS 2,875,606   Robinson _____ Mar. 3, 1959